United States Patent Office 3,819,621
Patented June 25, 1974

3,819,621
3-SUBSTITUTED-THIOMETHYL-3-CEPHEM-4-CARBOXYLIC ACID DERIVATIVES

Akira Morimoto, Matsubara, Kazuo Kariyone, Kyoto, Masaru Kurita, Takatsuki, Masashi Hashimoto, Toyonaka, and Osamu Nishiwaki, Takatsuki, Japan, assignors to Fujisawa Pharmaceutical Co., Ltd., Osaka, Japan
No Drawing. Filed Dec. 8, 1971, Ser. No. 206,191
Claims priority, application Japan, Dec. 30, 1970, 46/129,467; June 19, 1971, 46/44,088
Int. Cl. C07d 99/24
U.S. Cl. 260—243 C                 11 Claims

ABSTRACT OF THE DISCLOSURE

Compounds of the formula

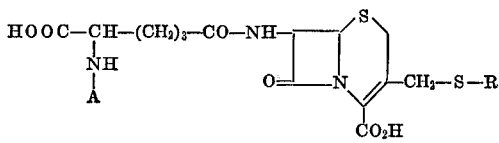

wherein A is

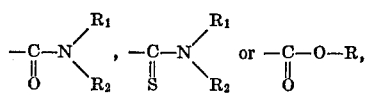

wherein $R_1$ and $R_2$ are hydrogen or various alkyl or aryl groups, $R_3$ is lower alkyl, and R is a thiadiazolyl, substituted thiadiazolyl or alkyl-1H-tetrazolyl are useful intermediates in the preparation of cephalosporin compounds having antimicrobial activity.

---

This invention relates to key intermediate compounds for cephalosporin derivatives and processes for preparing the same.

More particularly, this invention relates to new key intermediates of 7-(5-substituted-adipinamido)-3-heterocyclic-substituted-thiomethyl-3-cephem-4-carboxylic acid (I) for the preparation of cephalosporin derivatives and a process for preparing the same, and to an improved process for the preparation of 7-amino-3-heterocyclic-substituted-thiomethyl-3-cephem-4-carboxylic acid (II).

The process included in this invention are mentioned in the following scheme:

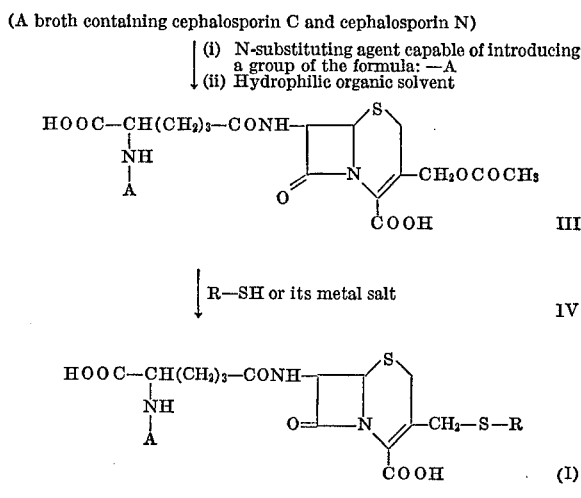

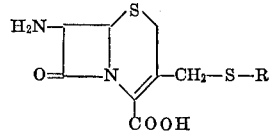

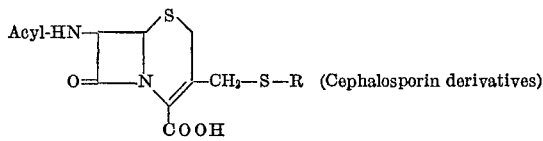

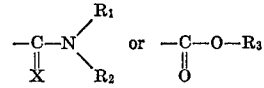

wherein A is the group of the formula:

$$-\underset{\underset{X}{\|}}{C}-N\diagdown\begin{matrix}R_1\\R_2\end{matrix} \quad \text{or} \quad -\underset{\underset{O}{\|}}{C}-O-R_3$$

in which $R_1$ and $R_2$ are each hydrogen or lower alkyl or aryl which may have one or more possible substituents, X is oxygen or sulfur and $R_3$ is lower alkyl, and R is heterocyclic which may have one or more possible substituents.

As a suitable lower alkyl group in the above formula, there may be mentioned, for example, a monovalent aliphatic carbon having 1 to 6 carbon atoms such as methyl, ethyl, propyl, isopropyl, butyl, isobutyl, tertiary-butyl, pentyl, hexyl, cyclohexyl and the like, and preferably lower alkyl having 1 to 4 carbon atoms and more preferably lower alkyl having 1 to 2 carbon atoms.

As a suitable aryl group in the above formula, there may be mentioned, for example, a monovalent aromatic hydrocarbon of not more than 10 carbon atoms such as phenyl, tolyl, naphthyl and the like. The aforementioned aryl group may have one or more suitable substituents such as halogen (e.g., chlorine, bromine, iodine and fluorine), nitro, lower alkoxy (e.g., methoxy, ethoxy, propoxy, butoxy, isopropoxy, isobutoxy, tertiarybutoxy, pentoxy, isopentoxy hexyloxy etc.), and the like.

A heterocyclic group in the above formula is more particularly a heterocyclic containing at least one nitrogen atom. As a suitable heterocyclic group there may be mentioned, for example, an unsaturated heteromonocyclic group containing one or more nitrogen atoms, (e.g., pyridyl, pyrazinyl pyrimidinyl, pyridazinyl, pyrrolyl, imidazolyl, pyrazolyl, tetrazolyl, etc.), an unsaturated heterobicyclic group or more particularly unsaturated benzenefused heterocyclic one containing one or more nitrogen atoms (e.g., indolizinyl, isoindolyl, indolyl, indazolyl, benzimidazolyl, purinyl, isoquinolyl, quinolyl, etc.), an unsaturated heteromonocyclic group containing one or more nitrogen and sulfur atoms (e.g., thiazolyl, thiadiazolyl, thiatriazolyl etc.), an unsaturated heteromonocyclic group containing one or more nitrogen and oxygen atoms (e.g., oxazolyl, oxadiazolyl, isooxazolyl, oxatriazolyl, etc.), said heterocyclic group being 5 to 6 membered ring. The aforementioned heterocyclic group may have one or more possible substituents such as lower alkyl (e.g., methyl, ethyl, propyl, isopropyl, butyl, isobutyl pentyl, hexyl, etc.), lower alkylthio (e.g., methylthio, ethylthio, propylthio, isopropylthio butylthio, isobutylthio, pentylthio, hexylthio, etc.), and the like.

In the field of chemistry relating to cephalosporin C and its derivatives it is well known that cephalosporin N, i.e. 6-(5-aminoadipinamido)penicillanic acid, is contained as a by-product in a broth obtained by culturing a cephalosporium strain producing cephalosporin C, i.e. 7-(5-aminoadipinamido)cephalosporanic acid.

Methods for isolating cephalosporin C from fermentation broth are described in British Pat. No. 810,196, wherein cephalosporin C is isolated by solvent fraction or by maintaining the broth at strong acidity (pH 3) and at 37° C. and in British Pat. No. 968,324, wherein cephalosporin C is isolated by making the broth strongly acidic with a strongly acidic ion-exchange resin and then maintaining said broth at 37° C. According to such methods as mentioned above, however, cephalosporin C is obtained in a lower yield, because cephalosporin C is an amphoteric compound and unstable under said conditions.

Methods for preparing 7-amino-3-heterocyclic-substituted-thiomethyl-3-cephem-4-carboxylic acid (II) are described in Japanese Patent official gazette No. 13,023/71, wherein 7-amino-3-heterocyclic-substituted - thiomethyl-3-cephem-4-carboxylic acid (II) is prepared by reacting cephalosporin C isolated from a broth or its salt with a corresponding substituted-thiol, subjecting the resulting compound to a nitroso reaction and then hydrolyzing the resulting compound. However, said known method, in which the cephalosporin C isolated from fermentation broth is used as a starting material and the nitroso reaction followed by hydrolysis is conducted, provides 7-amino - 3 - heterocyclic-substituted-thiomethyl-3-cephem-4-carboxylic acid (II) in a low yield and is not advantageous for industrial purpose.

Inventors of this invention have invented a new method for preparing 7-amino - 3 - heterocyclic-substituted-thiomethyl-3-cephem-4-carboxylic acid (II) in totally high yield via a new key intermediate, 7-(5-substituted-adipinamido)-3-heterocyclic-substituted-thiomethyl - 3 - cephem-4-carboxylic acid (I) which is prepared directly from the fermentation broth, containing cephalosporin C, that is without isolating cephalosporin C from the broth, and accordingly it is to be understood that the method of this invention is a newly improved method for preparation of key intermediate compound (I) and (II), which are useful for preparing cephalosporin derivatives and can work advantageously on an industrial scale.

Further, as another prior art, methods for preparing N-substituted-cephalosporin C (III), which is not the object compound of this invention, are known in West Germany Offenlegungsschrift No. 1,933,187, describing that N-substituted-cephalosporin C (III) is prepared by incubating the filtered fermentation broth under a strongly acidic condition to decompose cephalosporin N, followed by reacting the resulting mixture containing cephalosporin C with a corresponding N-substituting agent, and then by isolating the produced N-substituted-cephalosporin C (III) by extracting using a water-immiscible organic solvent. However, it is to be understood that such a prior method as mentioned above has a demerit that the cephalosporin C also is laible to be decomposed by treatment with a strong acid. On the contrary, according to methods of this invention, the acid-incubating treatment is unnecessary in the reaction and a hydrophilic organic solvent is used as a solvent instead of the water-immiscible organic solvent used in said prior invention, and accordingly it is to be understood that the methods of this invention lead to a higher yield of the N-substituted-cephalosporin C (III), from which the key intermediate compounds (I) and (II) also can derived ipso facto in a higher yield.

Each of processes of this invention is explained in detail in the following.

The first step of this invention, that is a method for preparing N-substituted cephalosporin C (III), is carried out by reacting a broth containing cephalosporin C, without acid-incubation, with a N-substituting agent capable of introducing the group of the formula: —A, wherein A is as defined above and treating the resultant mixture with a hydrophilic organic solvent. It is known in British Pat. No. 983,758 that the broth containing cephalosporin C and cephalosporin N can be obtained by culturing a cephalosporin C-producing strain.

Said broth, which is usually obtained in alkalinity, is adjusted to neutrality or slight acidity in order to protect cephalosporin C included in the broth from decomposition, and then the adjusted broth is subjected to filtration. This filtrated broth is used for the reaction.

The N-substituting agent capable of introducing the group of the formula: —A to be used in this reaction includes a compound selected from the group of compounds as follows:

 (V)

$R_2$—N=C=X (VI)

 (VII)

wherein $R_1$, $R_2$, X and $R_3$ are each as defined above and Y is halogen.

As a suitable halogen in the above formula, there may be mentioned, for example, chlorine, bromine and iodine.

In the case of using the compound (V), the group of the formula:

is introduced to provide the compound (III) wherein A is the group of the formula:

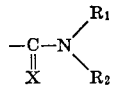

in which X, $R_1$ and $R_2$ are as defined above; in the case of using the compound (VI), the group of the formula:

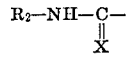

is introduced to provide the compound (III) wherein A is the group of the formula:

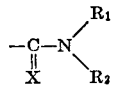

in which $R_1$ is hydrogen and X and $R_2$ are as defined above; and in the case of using the compound (VII), the group of the formula:

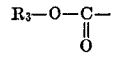

is introduced to provide the compound (III) wherein A is the group of the formula:

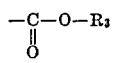

in which $R_3$ is as defined above.

The reaction can be preferably carried out under the conditions between slight acidity and slight alkalinity, namely, adjusting the reaction mixture to a suitable pH value with a base such as alkali metal hydroxide (e.g., sodium hydroxide, potassium hydroxide, etc.), alkali metal bicarbonate (e.g., sodium bicarbonate, potassium bicarbonate, etc.), alkali metal phosphate (e.g., sodium phosphate, potassium phosphate, etc.), alkali metal hydrogen phosphate (e.g., sodium hydrogen phosphate, potassium hydrogen phosphate, etc.), alkali metal dihydrogen phosphate (e.g., sodium dihydrogen phosphate, potassium dihydrogen phosphate, etc.), tertiary organic base (e.g., trimethylamine, triethylamine, N-methylpiperazine, pyridine, etc.), and the like, respectively.

After the reaction is completed, N-substituted-cephalosporin C (III) can be isolated, for example, by extracting the resulting reaction mixture, which also includes N-substituted-cephalosporin N and the other N-substituted-amino compounds as by products, with a solvent (e.g., ethyl acetate, methyl isobutyl ketone, etc.) to provide extract, removing the solvent, for example, by evaporation and treating the resulting residue as powder with a hydrophilic organic solvent (e.g., methanol, ethanol, acetone, tetrahydrofuran, dioxane, acetonitrile, etc.) to provide selectively crystals of the object compound (III) which is collected by a conventional manner, for example, filtration means. The crystals may be treated with a water-immiscible organic solvent such as aromatic hydrocarbon (e.g., benzene, toluene, etc.), halo-substituted-aliphatic hydrocarbon, ester compound (e.g., ethyl acetate, etc.), and the like, for further purification.

The second step of this invention is the reaction of N-substituted-cephalosporin C (III) with a heterocyclic thiol compound (IV) or its metal salt in a solvent to provide 7-(5-substituted-adipinamido)-3-heterocyclic - substituted-thiomethyl-3-cephem-4-carboxylic acid (I).

As a suitable metal salt in the heterocyclic thiol compound (IV), there may be mentioned, for example, alkali metal salt such as sodium salt, potassium salt and the like. As a most suitable solvent there may be mentioned, for example, water which may be used in a mixture with a hydrophilic organic solvent.

The reaction can be preferably carried out under neutral or slightly alkaline conditions. In the case of using the heterocyclic thiol compound (IV) in free form, the reaction may be preferably carried out in the presence of a base such as alkali metal hydroxide (e.g., sodium hydroxide, potassium hydroxide, etc.), alkali metal bicarbonate (e.g., sodium bicarbonate, potassium bicarbonate, etc.), alkali metal carbonate (e.g., sodium carbonate, potassium carbonate, etc.), trialkylamine (e.g., trimethylamine, triethylamine, etc.), and the like. The reaction temperature is not particularly restricted but the reaction is usually carried out at room temperature or under warming.

The resulting 7-(5-substituted-adipinamido) - 3 - heterocyclic-substituted-thiomethyl-3-cephem-4 - carboxylic acid (I) can be isolated in the form of its salt such as alkali metal salt (e.g., sodium salt, potassium salt, etc.), ammonium salt, organic amine salt (e.g., dicyclohexylamine, triethylamine, etc.), and the like.

Further, it is to be understood that in the aforementioned reaction, N-substituted-cephalosporin C (III) may be used in the form of the extract, for example, ethyl acetate extract containing it or of the powder or of the crystals, each form of which is prepared by the method as mentioned in the preceding first step. Among them, it may be preferable to use the compound (III) in the form of crystals.

The third step of this invention is to treat 7-(5-substituted-adipinamido)-3-heterocyclic - substituted - thiomethyl-3-cephem-4-carboxylic acid (I) with a silylating agent, then with an imino-halogenating agent and with an iminoetherification agent and to hydrolyze the resulting compound.

The reaction of 7-(5-substiuted-adipinamido)-3-heterocyclic-substituted-thiomethyl-3-cephem-4 - carboxylic acid (I) with a silylating agent is usually in a solvent.

As a suitable silylating agent in the reaction there may be employed a silylating agent which is used conventionally in the field of chemistry relating to cephalosporin derivative and there may be mentioned, for example, trialkylhalosilane such as trimethylchlorosilane; dialkyldihalosilane such as dimethyldichlorosilane; alkyltrihalosilane such as methyltrichlorosilane; hexaalkylcyclotrisilazane such as hexamethylcyclotrisilazane; octaalkylcyclotetrasilazane such as octamethylcyclotetrasilazane; trialkylsilylacetamide such as trimethylsilylacetamide; bis-trialkylsilylacetamide such as bis-trimethylsilylacetamide; dialkylsilylacetamide such as dimethylsilylacetamide; monoalkylsilylacetamide such as monomethylsilylacetamide, and the like. The reaction can be preferably carried out by using in a ratio of more than two molecular equivalent of the silylating agent to a starting compound, i.e. 7 - (5-substituted-adipinamido)-3-heterocyclic-substituted-thiomethyl-3-cephem-4-carboxylic acid (I).

In the reaction, chloroform and dichloromethane are usually used as a solvent, and other inert solvent such as tetrahydrofuran, dioxane and the like can be used as a solvent. The reaction temperature is not particularly restricted, but preferable from at room temperature to 40° C., though the reaction can be carried out even under cooling.

The reaction product is then treated with the imino-halogenating agent. As the imino-halogenating agent, there may be employed a imino-halogenating agent which is conventionally used in the field of chemistry relating cephalosporin derivatives and there are preferably employed phosphorus trichloride, phosphorus pentachloride, phosphorus pentabromide, phosphorus oxychloride, thionyl chloride, phosgene and the like. The reaction temperature is not particularly restricted, but the reaction is usually carried out from under cooling to at room temperature.

The resultant product is treated with the imino-etherification agent such as an alcohol (e.g., methanol, ethanol, propanol, isopropanol, butane, tertiary butanol, etc.) its metal alkoxide (e.g., an alkali metal alkoxide as sodium alkoxide, potassium alkoxide, etc.), and the like. The reaction temperature is not particularly restricted, but the reaction may be usually carried out from under cooling to at room temperature.

The resulting reaction product is finally subjected to hydrolysis reaction. The hydrolysis reaction is sufficiently effected by pouring said resulting reaction product into water. The water may be admixed with a hydrophilic organic solvent such as alcohol (e.g., methanol, ethanol, etc.) or a basic substance such as an alkali metal bicarbonate, trialkylamine, etc. or an acidic substance such as dilute hydrochloric acid, acetic acid, etc.

The obtained 7 - amino-3-heterocyclic-substituted-thiomethyl-3-cephem-4-carboxylic acid (II) exhibits an antibacterial activity and also is useful for preparing, by acylation, 3-heterocyclic-substituted-thiomethyl - 7 - acylated cephalosporin derivatives, for example, 7 - (1-H-tetrazol-1-ylacetamido)-3-(5-methyl-1,3,4-thiadiazol-2-ylthiomethyl) - 3-ceph-4-carboxylic acid, which possess a superior antibacterial activity and is useful for medical treatment of infectious diseases by pathogenic microorganism.

The following examples are for purposes of illustration of this invention, but are not intended to limit the same.

EXAMPLE 1

7-amino-3-(5-methyl-1,3,4-thiadiazolyl-2-yl)thiomethyl-3-cephem-4-carboxylic acid (A) 7 - [5-(3-phenylureido)adipinamido]cephalosporanic acid.—(i) A broth obtained by culturing a *Cephalosporium* IMI in a nutrient medium, in which starch and corn steep liquor were mainly contained, at about 30° C. for 80 hours, was adjusted to about pH 6.5 and then filtered. To the filtrate (1 liter) was added potassium hydrogen phosphate (20 g.), and then a solution of phenyl isocyanate (10 g.) in acetone (70 ml.) was dropwise added while stirring at 3 to 5° C. After the solution was stirred for an hour at the same temperature and filtered, the filtrate was adjusted to about pH 2 with hydrochloric acid and extracted in turn with 300 ml., 200 ml. and 100 ml. of ethyl acetate.

After the combined extracts were extracted in turn with 200 ml., 150 ml. and 100 ml. of phosphate buffer, pH 6.4, the phosphate buffer extracts were adjusted to pH 2 with hydrochloric acid and then extracted in turn with 150 ml., 100 ml. and 50 ml. of ethyl acetate. The organic extracts were washed with a saturated sodium chloride aqueous solution and dried over anhydrous sodium sulphate, and the solvent was removed off under reduced pressure. To the residue was added methanol (30 ml.), and the solution was allowed to stand overnight in a refrigerator. The crystalline material precipitated was filtered and washed with a small amount of methanol to give 7-[5-(3-phenylureido)adipinamido]cephalosporanic acid (2.57 g.), M.P. 135 to 140° C. (decomposition).

*Analysis.*—Calculated for $C_{23}H_{26}N_4O_9S \cdot CH_3OH$ (in percentage): C, 50.88; H, 5.33; N, 9.89. Found: C, 50.98; H, 5.42; N, 10.10.

Ultraviolet absorption spectrum (95% $C_2H_5OH$):

$\lambda_{max}$. 242 m$\mu$, $E_{1cm.}^{1\%}$ 507

$\lambda_{inf}$. 265 m$\mu$, $E_{1cm.}^{1\%}$ 183

(ii) To a filtrate (1 liter) from the broth cultured by the same procedures as Example 1 (A)–(i) which was adjusted to pH 7 with 10% sodium hydroxide was dropwise added a solution of phenyl isocyanate (15.0 g.) in ethyl acetate (50 ml.) while maintaining the pH value in a range of from 6.8 to 7.2. The solution was stirred for 15 minutes, filtered, adjusted to pH 1.5 with 20% sulfuric acid and extracted with ethyl acetate (500 ml.). After the ethyl acetate extract was then extracted with phosphate buffer, pH 6.4 (300 ml.), the phosphate buffer extract was adjusted to pH 1.5 with 20% sulfuric acid and further extracted with ethyl acetate (200 ml.). The extract was washed with a saturated sodium chloride aqueous solution and dried over anhydrous sodium sulphate. After the solvent was removed off under reduced pressure, the residue was dissolved in acetonitrile (or methanol or acetone) and allowed to stand overnight in a refrigerator. The crystalline material precipitated was collected by filtration, washed with acetonitrile (or methanol or acetone) and dried at room temperature under reduced pressure to give 7-[5-(3-phenylureido)adipinamido]cephalosporanic acid monohydrate (2.87 g.), M.P. 144 to 148° C.

*Analysis.*—Calculated for $C_{23}H_{26}N_4O_9S \cdot H_2O$ (in percentage): C, 50.00; H, 5.17; N, 10.14. Found: C, 50.13; H, 5.17; N, 10.16.

(iii) A filtrate (1 liter) from the broth obtained by the same procedures as in Example 1 (A)–(i) was adjusted to pH 7.4 with potassium hydrogen phosphate (30 g.), and a solution of phenyl isocyanate (15 g.) in acetone (100 ml.) was dropwise added while stirring. The mixture was then stirred for an hour, filtered, adjusted to pH 1.5 with 20% sulfuric acid and extracted with ethyl acetate (500 ml.). After the extract was then extracted with phosphate buffer, pH 6.4 (300 ml.), the phosphate buffer extract was adjusted again to pH 1.5 with 20% sulfuric acid and then extracted with ethyl acetate (200 ml.). The extract was washed with a saturated sodium chloride aqueous solution, dried over anhydrous sodium sulphate, and then distilled off under reduced pressure to leave the residue which was then dissolved in methanol (40 ml.) and allowed to stand overnight in a refrigerator. The precipitated crystalline material was collected by filtration, washed with methanol and then allowed to stand for a day at room temperature to give 7-[5-(3-phenylureido)adipinamido]cephalosporanic acid tetrahydrate (2.80 g.), M.P. 130 to 140° C. (decomposition).

*Analysis.*—Calculated for $C_{23}H_{26}N_4O_9S \cdot 4H_2O$ (in percentage): C, 45.82; H, 5.65; N, 9.24. Found: C, 45.62; H, 5.85; N, 9.37. Moisture (Karl Fisher Method): Calculated: $H_2O$, 11.88%. Found: $H_2O$, 10.57%.

This compound was dried at room temperature under reduced pressure to give 7-[5-(3-phenylureido)adipinamido]cephalosporanic acid monohydrate.

*Analysis.*—Calculated for $C_{23}H_{26}N_4O_9S \cdot H_2O$ (in percentage): C, 50.00; H, 5.17; N, 10.14. Found: C, 50.14; H, 5.16; N, 10.13. Moisture (Karl Fisher Method): Calculated: $H_2O$, 3.26%. Found: $H_2O$, 2.76%.

(B) 7-[5 - (3 - phenylureido)adipinamido]-3-(5-methyl-1,3,4-thiadiazol - 2 - yl)thiomethyl-3-cephem-4-carboxylic acid.—A solution of 7-[5-(3-phenylureido)adipinamido]cephalosporanic acid·$CH_3OH$ (2.8 g.), 5-methyl-1,3,4-thiadiazole-2-thiol (0.9 g.) and sodium bicarbonate (0.45 g.) in 40 ml. of phosphate buffer, pH 6.4, was stirred for 3 hours at 70° C., and washed with ethyl acetate (300 ml.). The aqueous layer separated was adjusted to pH 2 with 10% hydrochloric acid and then extracted with ethyl acetate (500 ml.). The extract was washed with a saturated sodium chloride aqueous solution, dried over magnesium sulphate and concentrated under reduced pressure to a volume of about 50 ml.

The precipitated powders were filtered and triturated with ether to give 7-[5-(3-phenylureido)adipinamido]-3-(5-methyl-1,3,4-thiadiazol - 2 - yl)thiomethyl-3-cephem-4-carboxylic acid (0.7 g.) as crystalline powders, M.P. 150 to 160° C. (decomposition).

Ultraviolet absorption spectrum (phosphate buffer, pH 6.4):

$\lambda_{max}$. 240 m$\mu$, $E_{1cm.}^{1\%}$ 320

$\lambda_{inf}$. 272 m$\mu$, $E_{1cm.}^{1\%}$ 154

The compound was then recrystallized from 95% ethanol to give a product which melts at from 168.5 to 169.5° C. (decomposition).

(C) 7-amino - 3 - (5-methyl-1,3,4-thiadiazol-2-yl)thiomethyl-3-cephem-4-carboxylic acid.—Triethylamine (0.55 ml.) was added to a suspension of 7-[5-(3-phenylureido)adipinamido] - 3 - (5-methyl-1,3,4-thiadiazol - 2 - yl)thiomethyl-3-cephem-4-carboxylic acid (2.4 g.) in dried dichloromethane (30 ml.) and the mixture was stirred for 10 minutes at room temperature.

After chlorotrimethylsilane (4.0 ml.) and N,N-dimethylaniline (3.6 ml.) were added, the mixture was refluxed for 30 minutes and then cooled to from −40 to −50° C., and to the cooled solution was added a fine phosphorus pentachloride (1.7 g.) at one time and stirred for 2.5 hours at the same temperature. To the resulting mixture cooled to from −60 to −65° C. was added absolute methanol (15 ml.) at one time with stirring, and the mixture was stirred for an hour at −30° C. After a mixture of methanol (8.5 ml.) and water (16.5 ml.) was dropwise added, the mixture was stirred for 30 minutes at the same temperature and then warmed to room temperature.

After the pH value of the resulting mixture was adjusted to pH 3.5, the mixture was put in a cool place for a while. The precipitates formed were contrifuged and sucked to separate the precipitate which was then washed with water, acetone and ether in turn, and dried in a desiccator to give 7-amino-3-(5-methyl-1,3,4-thiadiazol - 2 - yl)thiomethyl-3-cephem-4-carboxylic acid (950 mg.) as a white crystalline material.

Ultraviolet absorption spectrum (phosphate buffer, pH 6.4):

$\lambda_{max}$. 274 m$\mu$, $E_{1cm.}^{1\%}$ 325

EXAMPLE 2

7-amino-3-(5-methyl-1,3,4-thiadiazol-2-yl)thiomethyl-3-cephem-4-carboxylic acid (A) To a mixture of a filtrate (2000 liter) from the broth cultured by the same procedures as in Example 1(A) and ethyl acetate (200 liter) was added phenyl isocyanate (30 liter) while maintaining the mixture at a range of pH 7 with 15% sodium hydroxide aqueous solution under cooling at 5° C. The mixture was stirred for 2 hours at the same temperature. After the precipitates were filtered off, the filtrate was adjusted to pH 1.5 with 20% sulfuric acid and extracted with ethyl acetate. The ethyl acetate extract was again extracted with 3% sodium acetate aqueous solution and the extract was adjusted to pH 1.5 with 20% sulfuric acid and then extracted with ethyl acetate. After the ethyl acetate was removed off, the residual oil (16 kg.) was dissolved in methanol and allowed to stand overnight. The crystalline material precipitated was filtered washed with methanol and dried to give yellow powders (6.6 kg.).

(B) 7-[5-(3-phenylureido)adipinamido]-3-(5-methyl-1,3,4-thiadiazol-2-yl)thiomethyl-3-cephem-4-carboxylic acid A solution of the yellow powders obtained in Example 2(A) (30 kg.), sodium bicarbonate (1.3 kg.) and 5-methyl-1,3,4-thiadiazole-2-thiol (0.66 kg.) in water (30 liter) was stirred at 70° C. for 5 hours, poured into cooled water (30 liter) and adjusted to from pH 1 to 1.5 with 6 N hydrochloric acid below 10° C. A white crystalline material precipitated was collected by filtration, washed with cold water and dried to give 7-[5-(3-phenylureido)adipinamido]-3-(5 - methyl - 1,3,4 - thiadiazol-2-yl)thiomethyl - 3-cephem-4-carboxylic acid (2.8 kg.) as faint powders which was then recrystallized from 95% ethanol to give a compound melting at from 168.5 to 169.5° C. (decomposition).

(C) 7-amino-3-(5-methyl-1,3,4-thiadiazol-2-yl)thiomethyl-3-cephem-4-carboxylic acid To a suspension of 7 - [5 - (3 - phenylureido)adipinamido] -3 - (5 - methyl-1,3,4-thiadiazol-2-yl)thiomethyl-3-cephem-4-carboxylic acid (5.35 kg.) in dried dichloromethane (70 liter) were added chlorotrimethylsilane (9 liter) and N,N-dimethylaniline (7.8 liter) in turn with stirring. The mixture was refluxed for 2 hours, cooled to —20° C., followed by the addition of phosphorus pentachloride (2.8 kg.). The mixture was stirred for 2 hours at the same temperature and allowed to stand for 3 hours, and to the mixture was added methanol (32 liter). The mixture was stirred for 4 hours, until the temperature of the mixture reached at 5° C. After the addition of water (32 liter), the pH value of the resulting mixture was adjusted to pH 3.5 with triethylamine. The precipitates formed were filtered, washed with water and dried to give 7-amino - 3 - (5-methyl-1,3,4-thiadiazol-2-yl)thiomethyl-3-cephem-4-carboxylic acid (2.26 kg.).

Ultraviolet absorption spectrum (phosphate buffer, pH 6.4):

$\lambda_{max.}$ 275 m$\mu$, $E_{1 cm.}^{1\%}$ 340

EXAMPLE 3

7-amino-3-(5-methyl-1,3,4-thiadiazol-2-yl)thiomethyl-3-cephem-4-carboxylic acid

To a mixture of a filtrate (500 liter) from the broth cultured by the same procedures as in Example 1(A) and ethyl acetate (50 liter) was added phenyl isocyanate (7.5 liter) while maintaining the solution at pH 7 with 15% sodium hydroxide solution under cooling at 5° C. After the mixture was stirred for 2 hours and filtered, the filtrate was adjusted to pH 1.5 with 20% sulfuric acid and extracted with ethyl acetate. The ethyl acetate extract was washed with a saturated sodium chloride aqueous solution and extracted with a cooled 3% sodium acetate aqueous solution (30 liter). The aqueous extract was adjusted to from pH 6.5 to 6.6 with sodium bicarbonate under cooling and to the solution was added 5-methyl-1,3,4-thiadiazole-2-thiol (0.42 kg.). After stirring the mixture at 70° C. for 5 hours, the resulting mixture was poured into ice-water (30 liter). The mixture was adjusted to pH 4.5 with acetic acid washed with ethyl acetate, adjusted to from pH 1 to 1.5 with 20% sulfuric acid under cooling and extracted with a mixture of methyl isobutyl ketone and acetone. After the solvent was removed off, the residual oil was purified by adding acetone and removing off the acetone repeatedly to produce powders (2.73 kg.). To a suspension of said powders (195 liter) were added chlorotrimethyldichloromethane silane (4.3 liter) and then N,N-dimethylaniline (3.78 liter) with stirring. The mixture was refluxed for 2 hours and cooled to —20° C. Phosphorus pentachloride (1.63 kg.) was added, and the mixture was stirred for 5 hours. After the addition of methanol (15.5 liter), the mixture was stirred for 4 hours, to be followed by addition of water (15.5 liter) and the adjustment to pH 3.5. The precipitates formed were collected by filtration, washed and dried to give 7 - amino-3-(5-methyl-1,3,4-thiadiazol-2-yl)thiomethyl-3-cephem-4-carboxylic acid (0.47 kg.).

EXAMPLE 4

7-amino-3-(5-methyl-1,3,4-thiadiazol-2-yl)thiomethyl-3-cephem-4-carboxylic acid (A) 7 - [5 - isobutoxycarbonylamino)adipinamido] cephalosporanic acid.—To a filtrate (1 liter) from the broth cultured by the same procedures as in Example 1(A) was dropwise added a solution of isobutyl chloroformate (3.5 g.) in acetone (4 ml.) while maintaining the solution at pH 7 with 1,5 - diazocyclo[4,3,0]-non-5-ene under stirring at 5° C. After the mixture was stirred for an hour, a solution of isobutyl chloroformate (3.5 g.) in acetone (4 ml.) was added while maintaining the mixture at pH 7 with 1,5-diazocyclo[4,3,0]-non-5-ene. The mixture was then stirred until Ninhydrin test is negative, adjusted to pH 1.5 with 20% sulfuric acid and extracted with ethyl acetate. The ethyl acetate extract was washed with a saturated sodium chloride aqueous solution and extracted with 3% sodium acetate aqueous solution. After the aqueous extract was adjusted to pH 1.5 and then extracted with ethyl acetate, the extract was dried and concentrated under reduced pressure, leaving a residual oil which was treated with methanol to give 7-[5-(isobutoxycarbonylamino)adipinamido]cephalosporanic acid as powders. Dicyclohexylamine salt of 7-[5-(isobutoxy-carbonylamino)adipinamido]cephalosporanic acid as powders, M.P. 191 to 194° C. (decomposition) was given from 7 - [5 - (isobutoxycarbonylamno)adipinamido]cephalosporanic acid by a conventional method.

Analysis.—Calculated for $C_{21}H_{29}O_{10}N_3S \cdot C_{24}H_{46}N_2$ (in percentage): C, 61.61; H, 8.62; N, 7.98. Found: C, 61.31; H, 8.63; N, 7.68.

(B) 7 - [5-(isobutoxycarbonylamino)adipinamido]-3-(5 - methyl-1,3,4-thiadiazol-2-yl)thiomethyl-3-cephem-4-carboxylic acid.—A solution of 7-[5-(isobutoxycarbonylamino)adipinamido]cephalosporanic acid (2 g.), sodium bicarbonate (0.9 g.) and 5-methyl-1,3,4-thiadiazole-2-thiol (0.7 g.) in water (15 ml.) was stirred for 4.5 hours, adjusted to pH 4 with 6 N hydrochloric acid and washed with ethyl acetate. The mixture was adjusted to pH 1.5 and extracted with ethyl acetate. After the ethyl acetate extract was concentrated under reduced pressure, the residue was dissolved in a small amount of acetone, followed by the addition of sodium 2-ethylhexanoate. The precipitates formed were filtered and dried to give sodium salt of 7 - [5 - (isobutoxycarbonylamino)adipinamido]-3-(5-methyl-1, 3,4 - thiadiazol-2-yl)thiomethyl-3-cephem-4-carboxylic acid (0.8 g.).

Nuclear Magnetic Resonance Spectrum (in $D_2O + NaHCO_3$):

$\tau = 7.23$ (singlet):methyl proton on C-5 position of 1,3,4-thiadiazole nuclei $\tau = 4.87$ (doublet): C-6 proton on cephem nuclei $\tau = 4.35$ (doublet): C-7 proton on cephem nuclei (C) 7 - amino-3-(5-methyl-1,3,4-thiadiazol-2-yl)thiomethyl-3-cephem-4-carboxylic acid.—7-amino-3-(5-methyl-1,3,4-thiadiazol - 2 - yl)thiomethyl-3-cephem-4-carboxylic acid, a white crystalline material, was given from sodium salt of 7-[5-(isobutoxycarbonylamino)adipinamido]-3-(5 - methyl-1,3,4-thiadiazol-2-yl)thiomethyl-3-cephem-4-carboxylic acid by substantially the same procedures as in Examples 1(C) and 2(C).

EXAMPLE 5

7-amino-3-(5-methyl-1,3,4-thiadiazol-2-yl)thiomethyl-3-cephem-4-carboxylic acid N-phenylcarbamoyl chloride.—After phosgene was passed through ethyl acetate (200 ml.) for 45 minutes under ice-cooling, a solution of aniline (20 g.) in ethyl acetate (200 ml.) was added dropwise to the solution at from 5 to 10° C. while passing phosgene. After phosgene was introduced further for 30 minutes the excess phosgene and the solvent were distilled off to give oil (24 g.) including N-phenylcarbamoyl chloride.

(A) 7-[5-3-phenylureido)adipinamido]cephalosporanic acid.—To a mixture of a filtrate (1 liter) from the broth cultured by the same procedures as in Example 1(A) and potassium hydrogen phosphate (30 g.) was dropwise added a solution of the oil (15 g.) obtained in above Example 5 under ice-cooling, and the mixture was stirred for 45 minutes. After the filtration was made, the filtrate was washed with ethyl acetate. The aqueous layer was adjusted to pH 2 with 10% hydrochloric acid and extracted with ethyl acetate. The extract was washed with a saturated sodium chloride aqueous solution, dried over magnesium sulphate and concentrated under reduced pressure, leaving the residue which was triturated with ether and dried to give 7-[5-3-phenylureido)adipinamido]cephalosporanic acid (3 g.) as powders.

Ultraviolet absorption spectrum:

$$\lambda_{max}^{H_2O}\ 241\ m\mu,\ E_{1\,cm.}^{1\%}\ 395$$

(C) 7 - amino-3-(5-methyl-1,3,4-thiadiazol-2-yl)thiomethyl - 3 - cephem-4-carboxylic acid.—7-amino-3-(5-methyl - 1,3,4 - thiadiazol-2-yl)thiomethyl-3-cephem-4-carboxylic acid, a white crystalline material, was given from 7-[5-(3-phenylureido)adipinamido]cephalosporanic acid by substantially the same procedures as in Examples 1(B) and 1(C).

EXAMPLE 6

(A) The following compounds were obtained by using substantially the same procedures as those of the Examples 1(A), 2(A) and 5(A).

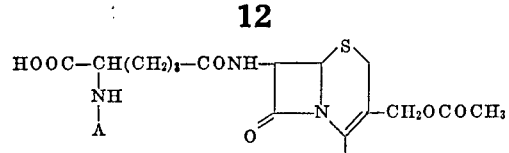

| No. | A— | Physical properties |
|---|---|---|
| 1 | H₃C—⟨phenyl⟩—NH—CO— | Dihydrate. M.P. 155 to 158° C. (decomposition). Ultraviolet absorption spectrum (phosphate buffer, pH 6.4): $\lambda_{max.}\ 243\ m\mu,\ E_{1\,cm.}^{1\%}\ 400$ $\lambda_{inf.}\ 250\ m\mu,$ |
| 2 | Cl—⟨phenyl⟩—NH—CO— | M.P. 143 to 145° C. (decomposition). Ultraviolet absorption spectrum (phosphate buffer, pH 6.4): $\lambda_{max.}\ 248\ m\mu,\ E_{1\,cm.}^{1\%}\ 493$ $\lambda_{inf.}\ 274\ m\mu,$ |
| 3 | ⟨naphthyl⟩—NH—CO— | Ultraviolet absorption spectrum (phosphate buffer, pH 6.4): $\lambda_{max.}\ 222\ m\mu,\ E_{1\,cm.}^{1\%}\ 855$ $\lambda_{inf.}\ 270\ m\mu,\ E_{1\,cm.}^{1\%}\ 152$ |
| 4 | ⟨phenyl⟩—NH—CS— | Ultraviolet absorption spectrum (phosphate buffer, pH 6.4): $\lambda_{max.}\ 453\ m\mu,\ E_{1\,cm.}^{1\%}\ 337$ |
| 5 | H₃C—CH₂—NH—CO— | $\tfrac{3}{2}H_2O$ M.P. 105 to 107° C. (decomposition). |

(B) The following compounds were obtained by using substantially the same procedures as those of the Examples 1(B), 2(B) and 4(B).

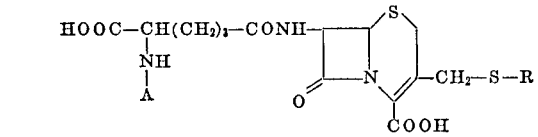

| No. | A— | —R | Nuclear magnetic resonance spectrum (in D₂O + NaHCO₃) |
|---|---|---|---|
| 1 | CH₃ / ⟨phenyl⟩ / NH—CO— | N—N, S, CH₃ (thiadiazolyl) | τ=7.25 (singlet):methyl proton on C-position of 1,3,4-thiadiazole nuclei. τ=4.95 (doublet):C-6 proton on cephem nuclei. τ=4.40 (doublet):C-7 proton on cephem nuclei. |
| 2 | C₂H₅ / NH—CO— | N—N, S, SCH₃ (thiadiazolyl) | τ=7.24 (singlet):methylthio proton on C-5 position of 1,3,4-thiadiazole nuclei. τ=4.90 (doublet):C-6 proton on cephem nuclei. τ=4.38 (doublet):C-7 proton on cephem nuclei. |
| 3 | ⟨phenyl⟩ / NH—CO— | N—N, S (thiadiazolyl) | τ=4.98 (doublet):C-6 proton on cephem nuclei. τ=4.40 (doublet):C-7 proton on cephem nuclei. τ=0.50 (singlet):C-5 proton on 1,3,4-thiadiazole nuclei. |
| 4 | Same as above | N—N, S, CH₃ (thiadiazolyl) | τ=7.25 (singlet): [methyl proton on C-5 position of 1,3,4-thiadiazole nuclei. τ=4.93 (doublet):C-6 proton on cephem nuclei. τ=4.35 (doublet):C-7 proton on cephem nuclei. |
| 5 | do | N—N, N, CH₃ (tetrazolyl) | τ=6.00 (singlet):methyl proton on C-1 position of 1H-tetrazole nuclei. τ=4.95 (doublet):C-6 proton on cephem nuclei. τ=4.40 (doublet):C-7 proton on cephem nuclei. |

13

(C) The following compounds were obtained by using substantially the same procedures as those of the Examples 1(C), 3, 4(C) and 5(C).

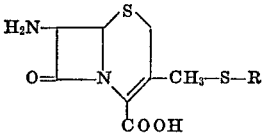

| No. | —R | Physical properties |
|---|---|---|
| 1 | 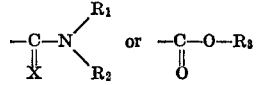 (N—N, S, unsubstituted) | Ultraviolet absorption spectrum (phosphate buffer, pH 6.4): $\lambda_{max}.$ 275 m$\mu$, $E_{1cm}^{1\%}$ 394 |
| 2 | N—N, S, —CH$_3$ | Ultraviolet absorption spectrum (phosphate buffer, pH 6.4): $\lambda_{max}.$ 275 m$\mu$, $E_{1cm}^{1\%}$ 390. Analysis, calculated for C$_{11}$H$_{12}$O$_5$N$_4$S$_3$: C 38.36, H 3.51, N 16.27, S 27.93. Found: C 38.54, H 3.47, N 16.17, S 27.68. |
| 3 | N—N, S, —CH$_2$CH$_3$ | Ultraviolet absorption spectrum (phosphate buffer, pH 6.4): $\lambda_{max}.$ 275 m$\mu$, $E_{1cm}^{1\%}$ 377 |
| 4 | N—N, S, —CH$_2$CH$_2$CH$_3$ | Ultraviolet absorption spectrum (phosphate buffer, pH 6.4): $\lambda_{max}.$ 275 m$\mu$, $E_{1cm}^{1\%}$ 377 |
| 5 | N—N, S, —S CH$_3$ | Ultraviolet absorption spectrum (phosphate buffer, pH 6.4): $\lambda_{max}.$ 278 m$\mu$, $E_{1cm}^{1\%}$ 353. M.P. 197 to 198° C. (decomposition). |

What is claimed is:

1. A compound of the formula:

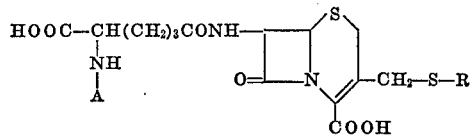

wherein A is the group of the formula:

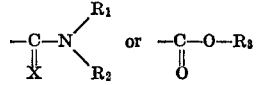

in which $R_1$ and $R_2$ are each hydrogen, lower alkyl, phenyl, halophenyl, tolyl, lower alkoxyphenyl, or naphthyl, X is oxygen or sulfur, and $R_3$ is lower alkyl, and R is thiadiazolyl, lower alkylthiadiazolyl, lower alkylthiothiadiazolyl or lower alkyl-1H-tetrazoyl.

14

2. The compound according to claim 1 in which A is the group of the formula:

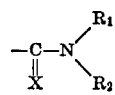

wherein $R_1$ is hydrogen and $R_2$ is phenyl, halophenyl, tolyl, lower alkoxyphenyl or naphthyl.

3. The compound according to claim 2 in which R is 1,3,4-thiadiazol-2-yl, 5-lower alkyl-1,3,4-thiadiazol-2-yl, 5-lower alkylthio-1,3,4-thiadiazol-2-yl or 1-lower alkyl-1H-tetrazol-5-yl.

4. The compound according to claim 3 in which $R_2$ is phenyl, X is oxygen and R is 5-methyl-1,3,4-thiadiazol-2-yl.

5. The compound according to claim 3 in which $R_2$ is tolyl, X is oxygen and R is 5-methyl-1,3,4-thiadiazol-2-yl.

6. The compound according to claim 1 in which A is

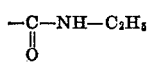

and R is 5-methylthio-1,3,4-thiadiazol-2-yl.

7. The compound according to claim 3 in which $R_2$ is phenyl, X is oxygen and R is 1,3,4-thiadiazol-2-yl.

8. The compound according to claim 3 in which $R_2$ is phenyl, X is oxygen and R is 1-methyl-1H-tetrazol-5-yl.

9. The compound according to claim 1 in which A is the group of the formula:

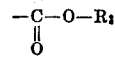

10. The compound according to claim 9 in which R is 1,3,4-thiadiazol-2-yl, 5-lower alkyl-1,3,4-thiadiazol-2-yl, 5-lower alkylthio-1,3,4-thiadiazol-2-yl or 1-lower alkyl-1H-tetrazol-5-yl.

11. The compound according to claim 10 in which $R_3$ is isobutyl and R is 5-methyl-1,3,4-thiadiazol-2-yl.

References Cited
UNITED STATES PATENTS 3,641,021 2/1972 Ryan _____ 260—243 C
3,499,909 3/1970 Weissenburger et al.
260—243 C NICHOLAS S. RIZZO, Primary Examiner U.S. Cl. X.R.
424—246